US 12,487,259 B2

(12) United States Patent
Leonard et al.

(10) Patent No.: US 12,487,259 B2
(45) Date of Patent: Dec. 2, 2025

(54) CONTACTLESS POWER METER

(71) Applicant: Senva Inc., Beaverton, OR (US)

(72) Inventors: Scott Leonard, Portland, OR (US); Dalton Paull, Scappoose, OR (US); Kent Holce, Portland, OR (US); Andre Perra, Portland, OR (US)

(73) Assignee: Senva Inc., Beaverton, OR (US)

( * ) Notice: Subject to any disclaimer, the term of this patent is extended or adjusted under 35 U.S.C. 154(b) by 121 days.

(21) Appl. No.: 18/361,360

(22) Filed: Jul. 28, 2023

(65) Prior Publication Data

US 2025/0035683 A1 Jan. 30, 2025

(51) Int. Cl.
*G01R 21/08* (2006.01)

(52) U.S. Cl.
CPC .................. *G01R 21/08* (2013.01)

(58) Field of Classification Search
CPC .......... G01R 15/202; G01R 19/2513; G01R 19/175; G01R 29/0814; G01R 19/0092; G01R 31/00; G01R 31/08; G01R 19/165; G01R 19/1659; G01R 31/085; G01R 21/06; G01R 21/00; G01R 29/0878; G01R 33/00; G01R 33/072; G01R 21/08; H02J 50/005; H02J 50/402; H02J 50/40; H02J 50/10; H02J 7/00304; H02J 7/0042; H02J 50/502; H02J 7/0044; H02J 50/05; H02J 13/00022; H05K 1/14; H05K 5/00; H05K 7/02; H05K 1/185; H05K 1/181; H05K 2201/10151; H01R 13/5219; G01D 7/00; G01D 5/347; G01D 21/02; H04L 1/0041; H04B 17/29; H04B 17/23; H04B 5/79; H04B 3/52; H04B 5/24; H04B 3/46; H04B 2203/5495; H04B 5/28; H04B 2203/5458; H04B 2203/5487; H04B 2203/5433; H01F 38/14; H01F 2003/005; H01F 27/2804; H01F 27/36; H01F 5/003; H01F 27/24
See application file for complete search history.

(56) References Cited

U.S. PATENT DOCUMENTS

| 4,795,975 A | * | 1/1989 | Cox ..................... G01R 1/18 174/355 |
| 4,829,239 A | * | 5/1989 | Holstein ............... G01R 21/08 324/111 |
| 5,027,061 A | * | 6/1991 | Palmer ................ G01R 22/065 324/156 |

(Continued)

FOREIGN PATENT DOCUMENTS

| CN | 2304127 Y | 1/1999 |
| CN | 111551779 A | 8/2020 |
| EP | 3153869 B1 | 12/2019 |

OTHER PUBLICATIONS

EXTECH Instruments Product Datasheet, www.extech.com, Copyright 2007-2008, 1 page.

(Continued)

*Primary Examiner* — Vinh P Nguyen
(74) *Attorney, Agent, or Firm* — Barley Snyder

(57) ABSTRACT

A power meter includes a housing attached to a conductor, a hall-effect current sensor disposed in the housing and contactlessly sensing a current of a conductor signal transmitted along the conductor, and a voltage sensor disposed in the housing and contactlessly sensing a voltage of the conductor signal.

20 Claims, 8 Drawing Sheets

(56) References Cited

U.S. PATENT DOCUMENTS

| | | | |
|---|---|---|---|
| 5,892,430 A * | 4/1999 | Wiesman | H02J 13/00002 361/93.6 |
| 6,771,058 B2 * | 8/2004 | Lapinksi | G01R 21/133 324/117 R |
| 7,084,783 B1 * | 8/2006 | Melvin, Jr. | G01D 11/24 455/557 |
| 7,164,263 B2 * | 1/2007 | Yakymyshyn | G01R 15/207 324/117 R |
| 7,265,533 B2 | 9/2007 | Lightbody et al. | |
| 8,014,915 B2 * | 9/2011 | Jeon | H04L 12/64 455/556.1 |
| 8,461,719 B2 * | 6/2013 | Kesler | B60L 53/122 307/104 |
| 8,930,152 B2 | 1/2015 | Patel et al. | |
| 9,063,184 B2 | 6/2015 | Carpenter et al. | |
| 9,081,043 B2 | 7/2015 | Park et al. | |
| 9,379,556 B2 * | 6/2016 | Haensgen | H02J 50/001 |
| 9,535,097 B2 | 1/2017 | Davis et al. | |
| 9,726,700 B2 | 8/2017 | Shamir | |
| 9,778,285 B2 | 10/2017 | Fox | |
| 9,829,516 B1 | 11/2017 | Ernst | |
| 9,915,689 B2 | 3/2018 | Matsuura et al. | |
| 10,352,967 B2 | 7/2019 | Steuer et al. | |
| 11,112,433 B2 | 9/2021 | Worones et al. | |
| 11,614,469 B2 * | 3/2023 | Dutta | G01R 21/133 324/127 |
| 2017/0336447 A1 | 11/2017 | Valenti et al. | |
| 2019/0154734 A1 | 5/2019 | Chu et al. | |
| 2019/0346487 A1 | 11/2019 | Laurino et al. | |
| 2021/0150877 A1 | 5/2021 | Menzel | |
| 2022/0178971 A1 | 6/2022 | Dutta et al. | |

OTHER PUBLICATIONS

International Journal on Advances in Networks and Services, vol. 15 No. 1 & 2, year 2022, http://www.iariajournals.org/networks_and_services/, 43 pages.

PCT Notification of Transmittal of the International Search Report and Written Opinion dated Nov. 19, 2024, corresponding to Application No. PCT/US2024/039706, 22 pages.

Pradeep Pai, et al., "Non-Intrusive Electric Power Sensors for Smart Grid", Published Oct. 28, 2012, 2 pages, Electrical and Computer Electronics Engineers.

Peter Lindahl, et al., "Noncontact Sensors and Nonintrusive Load Monitoring (NILM) Aboard the USCGC Spencer", Published Sep. 12, 2016, 5 pages.

* cited by examiner

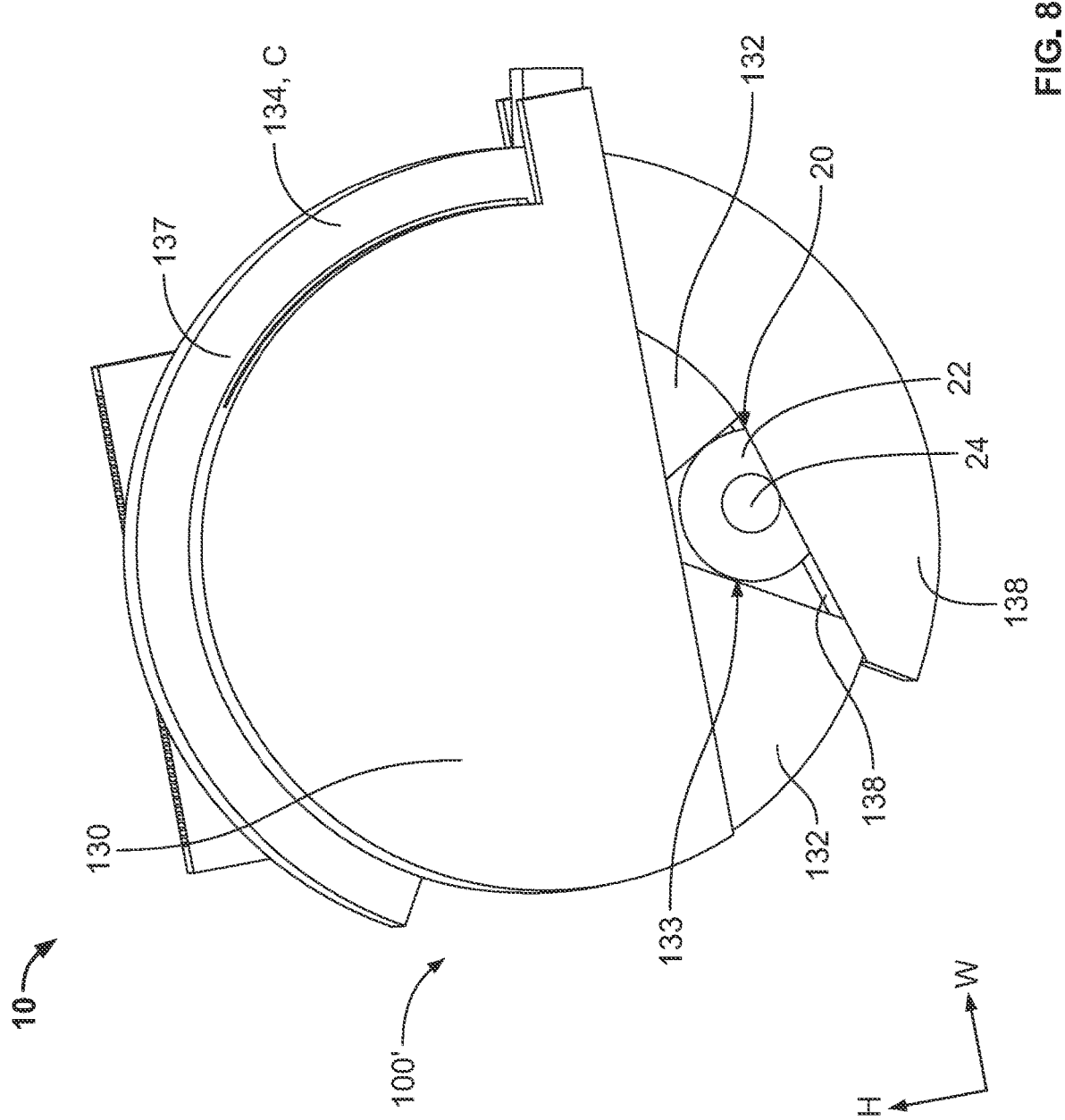

CONTACTLESS POWER METER

FIELD OF THE INVENTION

The present invention relates to a sensor and, more particularly, to a power meter disposed on a conductor and contactlessly sensing a signal transmitted along the conductor.

BACKGROUND

A power meter designed to determine the power transmitted along a conductor commonly has a current transformer and a voltage sensor. When the power meter is attached to the conductor, the current transformer senses a current of a signal transmitted along the conductor and the voltage sensor senses a voltage of the signal transmitted along the conductor. The power meter has a controller that determines a power of the signal transmitted along the conductor from the sensed current and voltage.

The current transformer often used in the power meter includes an iron core and a coil wrapped around the iron core; the current transformer is a costly and bulky component. The voltage sensor most commonly requires tapping into the conductor, which significantly complicates assembly and requires the use of voltage transformers. The current transformer and the voltage sensor both increase the size, weight, cost, and installation difficulty of the power meter. Further, most power meters have limited options for the customization and transmission of the output sensor data.

SUMMARY

A power meter includes a housing attached to a conductor, a hall-effect current sensor disposed in the housing and contactlessly sensing a current of a conductor signal transmitted along the conductor, and a voltage sensor disposed in the housing and contactlessly sensing a voltage of the conductor signal.

BRIEF DESCRIPTION OF THE DRAWINGS

The invention will now be described by way of example with reference to the accompanying Figures, of which:

FIG. 8 is a side view of the power meter of FIG. 7 with the housing in a closed position.

DETAILED DESCRIPTION OF THE EMBODIMENT(S)

Figure 1:
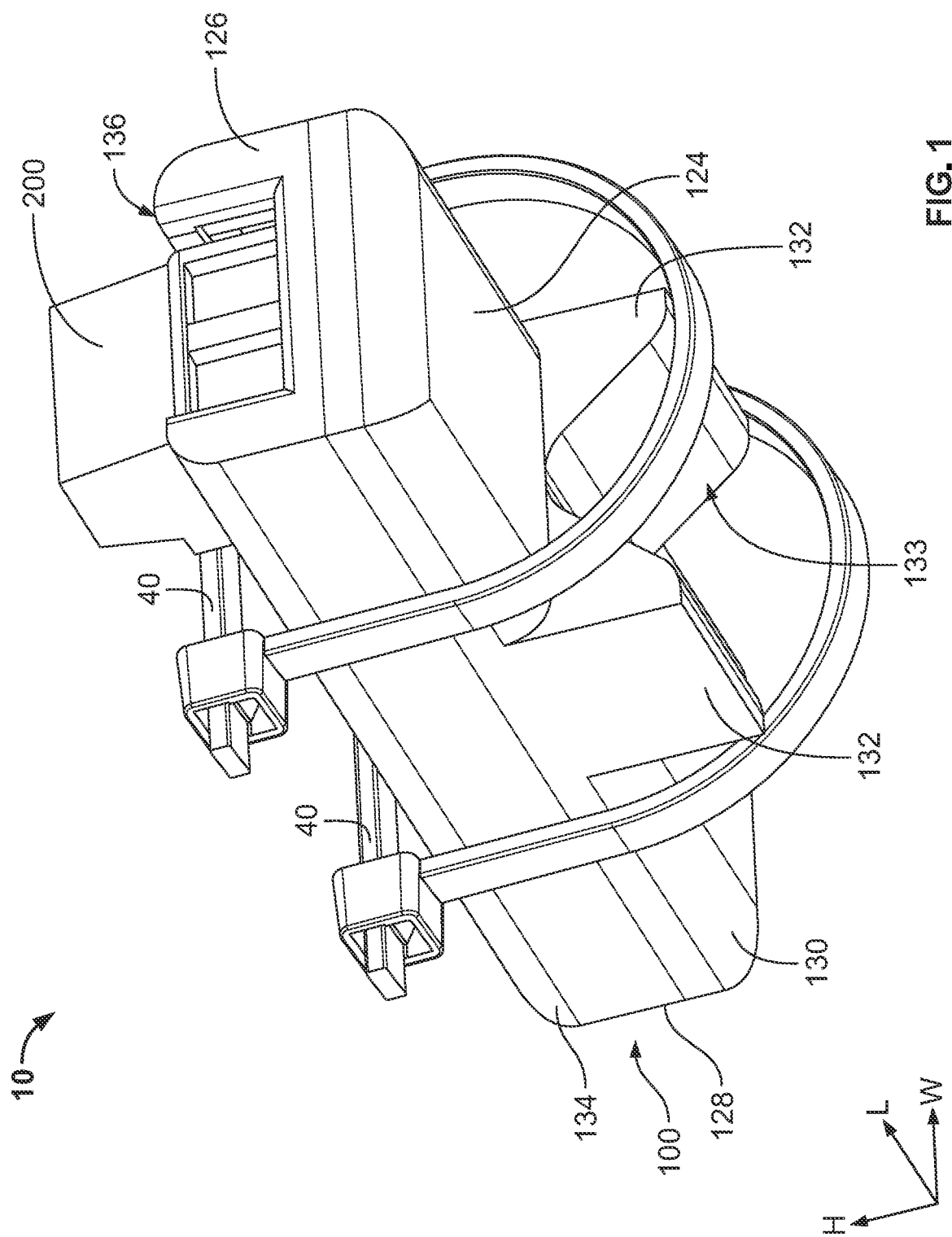
FIG. 1 is a perspective view of a power meter according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "longitudinal direction", "height direction", and "width direction". These descriptors are merely for clarity of the description and for differentiation of the various directions. These directional descriptors do not imply or require any particular orientation of the disclosed elements.

FIG. 1 is a perspective view of a power meter 10 according to an embodiment. The power meter 10, as shown in FIGS. 1-3, includes a housing 100, a printed circuit board (PCB) 140 disposed in the housing 100, a plurality of sensors 150, 160, 170 disposed in the housing 100, a near field communication (NFC) interface 180, an external connection device 200, a controller 190 connected to the NFC interface 180 and the external connection device 200, and a shielding 220.

Figure 2:
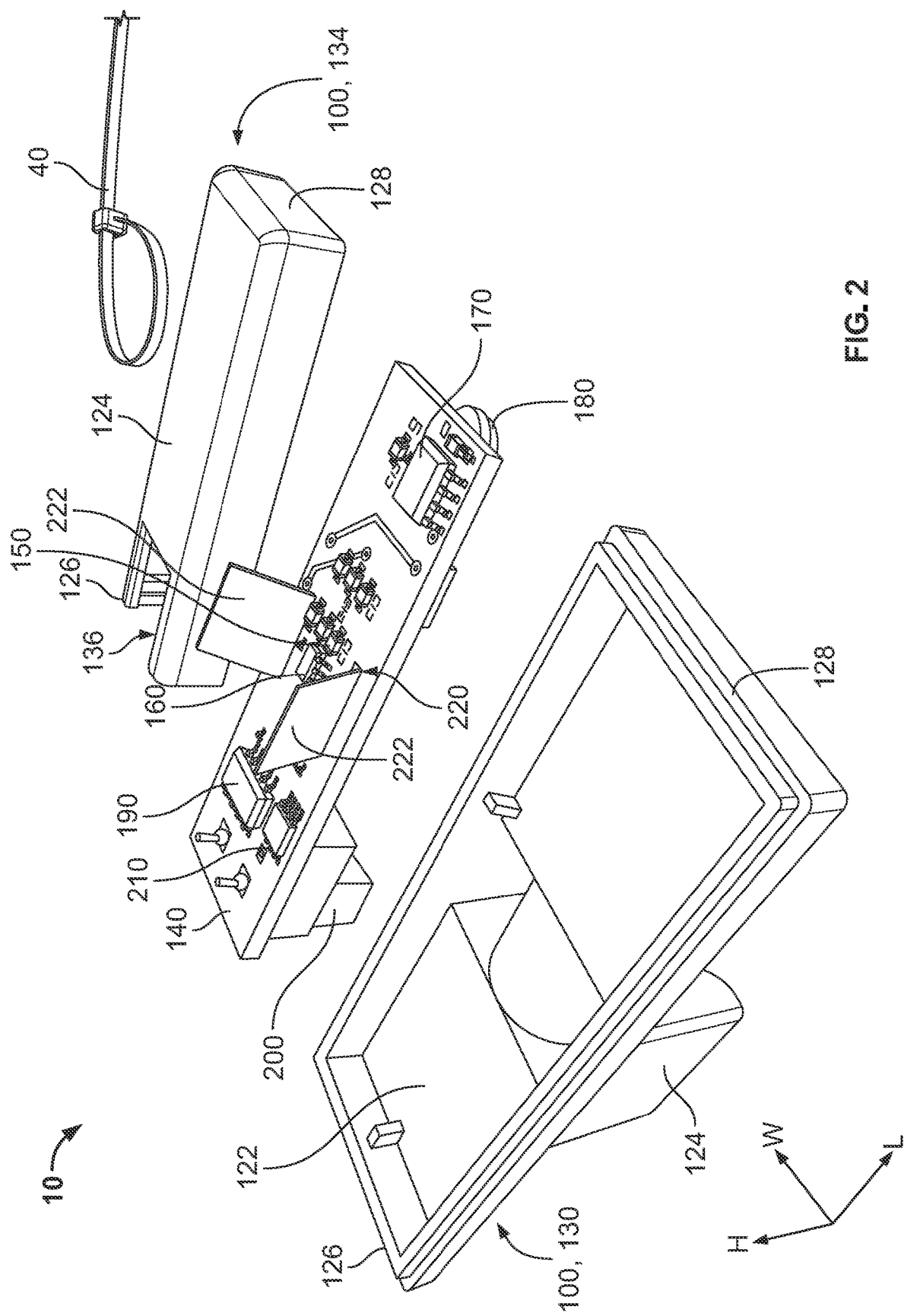
FIG. 2 is an exploded perspective view of the power meter.
Figure 3:
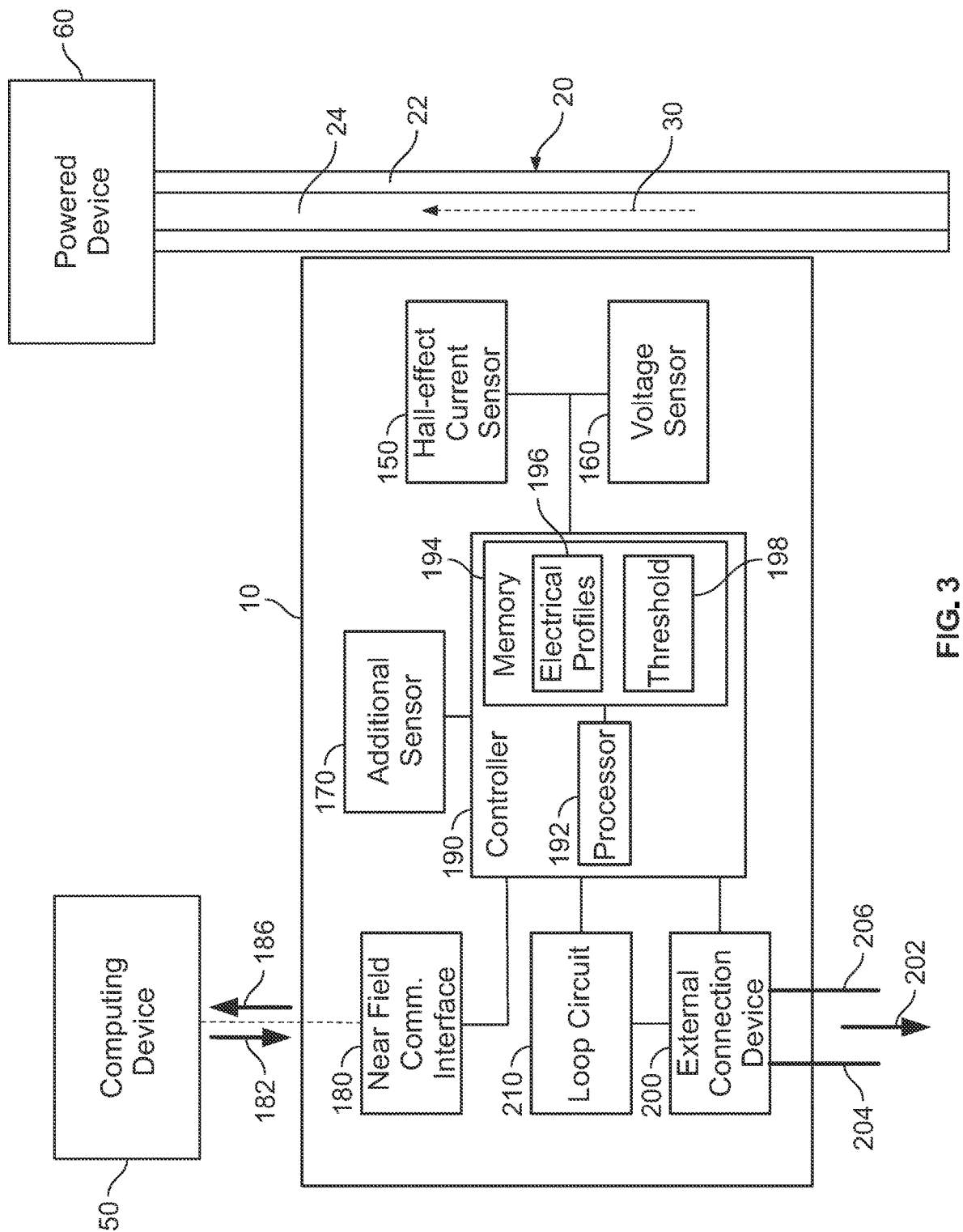
FIG. 3 is a block diagram of the power meter.

The housing 100, as shown in FIGS. 1 and 2, has an inner surface 122 and an opposite outer surface 124. The housing 100 has a first end 126 and a second end 128 opposite the first end 126 in a longitudinal direction L of the power meter 10.

In the embodiment shown in FIGS. 1 and 2, the housing 100 is formed of a first portion 130 and a second portion 134 that are attached together to form the overall housing 100, as described in greater detail below. Each of the first portion 130 and the second portion 134 has part of the inner surface 122 and part of the outer surface 124, and forms part of the first end 126 and part of the second end 128.

As shown in FIGS. 1 and 2, the first portion 130 has a pair of protrusions 132 that extend in a height direction H perpendicular to the longitudinal direction L. Each of the protrusions 132, in the shown embodiment, has an approximately triangular shape. The protrusions 132 are formed of the material of the housing 100 and define a part of both the inner surface 122 and the outer surface 124. The protrusions 132 are positioned mirror symmetrically and define a protrusion space 133 between them, as shown in FIG. 1. The protrusions 132 are positioned approximately centrally along the longitudinal direction L between the first end 126 and the second end 128.

The second portion 134, as shown in FIGS. 1 and 2, has an opening 136 at the first end 126. The opening 136 extends through the second portion 134 from the outer surface 124 to the inner surface 122.

The housing 100 is formed from a plastic material, such as acrylonitrile butadiene styrene (ABS). In the shown embodiment, each of the first portion 130 and the second portion 134 is monolithically formed in a single piece from the plastic material of the housing 100.

The PCB 140, as shown in FIG. 2, may be any type of PCB that can accommodate and connect the components described below. As shown in FIG. 2, the sensors 150, 160, 170, the NFC interface 180, the controller 190, the external connection device 200, the loop circuit 210, and the shielding 220 are positioned on the PCB 140. The PCB 140 electrically connects the sensors 150, 160, 170, the NFC interface 180, the controller 190, the external connection device 200, and the loop circuit 210; a block diagram schematically indicating the connections between the sensors 150, 160, 170, the NFC interface 180, the controller 190, the external connection device 200, and the loop circuit 210 is shown in FIG. 3 and will be described in greater detail below.

The sensors 150, 160, 170 disposed on the PCB 140 include a hall-effect current sensor 150, a voltage sensor 160, and, in the shown embodiment, an additional sensor 170. The hall-effect current sensor 150 may be any type of sensor that can contactlessly sense a current using a Hall element. The hall-effect current sensor 150 does not require an iron core or a coil to sense the current. The voltage sensor 160 may be any type of sensor that can contactlessly sense a voltage, such as a voltage electrode that senses a voltage by capacitance. The additional sensor 170, in the shown embodiment, can sense at least one of a humidity and a temperature of an environment of the power meter 10. In other embodiments, the power meter 10 may omit the additional sensor 170, or may have a plurality of additional sensors 170 sensing humidity, temperature, and any other qualities desirable for the application of the power meter 10.

The NFC interface 180, shown in FIGS. 2 and 3, is disposed on the PCB 140 and may be any device capable of exchanging data in a near field proximity, such as a Bluetooth or a Zigbee device.

The external communication device 200, shown in FIGS. 1-3, is disposed on the PCB 140 and may be any device capable of outputting an analog signal or a digital signal. The external communication device 200 may be connectable to at least one external signal wire 204 for outputting the analog or digital signal. The external communication device 200 may additionally be connectable to an external power wire 206 and may receive power from the external power wire 206. In various embodiments, the external communication device 200 may operate under a 2-wire data and power communication protocol, such as the KNX communication protocol, may operate under the RS-485 communication protocol, may operate under a 3-wire digital output protocol, or may operate under a 2-wire loop powered or 3-wire analog communication protocol. The loop powered embodiments, as shown in FIGS. 2 and 3, include a loop circuit 210 that is controllable to vary an output signal from 4-20 mA, as described in greater detail below. In another embodiment, the external communication device 200 may be capable of exchanging the output signal wirelessly, such as by WiFi, Bluetooth, or Zigbee. In another embodiment, the external communication device 200 may be a wired Ethernet interface that may include a Power over Ethernet (PoE) capability.

As shown in FIG. 2, the controller 190 is disposed on the PCB 140 and, as shown in FIG. 3, has a processor 192 and a memory 194 connected to the processor 192. The memory 194 is a non-transitory computer readable medium storing a plurality of computer-readable instructions that, when executed by the processor 192, perform the functions of the controller 190 described herein. The memory 194 additionally stores a plurality of electrical profiles 196 that indicate various types of powered devices, such as constant volume fans or pumps, variable frequency drive (VFD) fans or pumps, electronically commutated motors (ECM)s, and any other type of powered devices, correlated and distinguishable from one another with identifying current, voltage, power, and/or phase profiles. The memory 194 additionally stores a plurality of thresholds 198 described in greater detail below. The controller 190, as shown in FIG. 3, is connected to the hall-effect current sensor 150, the voltage sensor 160, the additional sensor 170, the NFC interface 180, the external connection device 200 and, in the shown embodiment, the loop circuit 210.

The shielding 220 of the power meter 10 is shown in FIG. 2. The shielding 220 includes a pair of panels 222 each extending at an angle from the PCB 140. The panels 222 each extend diagonally away from the PCB 140, at an acute angle with respect to the height direction H and at an acute angle with respect to a width direction W perpendicular to the height direction H and the longitudinal direction L. The hall-effect current sensor 150 and the voltage sensor 160 are positioned on the PCB 140 between the panels 222. The panels 222 each extend away from one another on opposite sides of the hall-effect current sensor 150 and the voltage sensor 160; the panels 222 are positioned mirror symmetrically about the longitudinal direction L. In an embodiment, the panels 222 are each formed of mu-metal. In other embodiments, the panels 222 can be formed of any conductive material used for electromagnetic shielding.

The power meter 10 is assembled from the state shown in FIG. 2 to the state shown in FIG. 1. The PCB 140 with the aforementioned components disposed on the PCB 140 is positioned between the first portion 130 and the second portion 134 of the housing 100, and the first portion 130 and the second portion 134 are connected together to enclose the PCB 140 and components on the PCB 140 within the housing 110. The first portion 130 and the second portion 134 may be attached to one another mechanically, such as by latching or a press-fit, with an adhesive material, or may just be held together by the fasteners 40 described in greater detail below.

In the assembled state of the power meter 10, with the PCB 140 positioned in the housing 100, the panels 222 of the shielding 220 are each received along the inner surface 122 of the housing 100 in one of the protrusions 132, which cover the panels 222. The external communication device 200 is positioned in the opening 136 of the second portion 134 of the housing 100 and protrudes through the opening 136 beyond the outer surface 124 of the housing 100.

The use of the power meter 10 to determine qualities of a conductor signal 30 transmitted along a conductor 24 of a wire 20, and to output a state of a powered device 60 connected to the wire 20 from the determined conductor signal 30, will now be described in greater detail primarily with reference to FIGS. 3-5.

Figure 4:
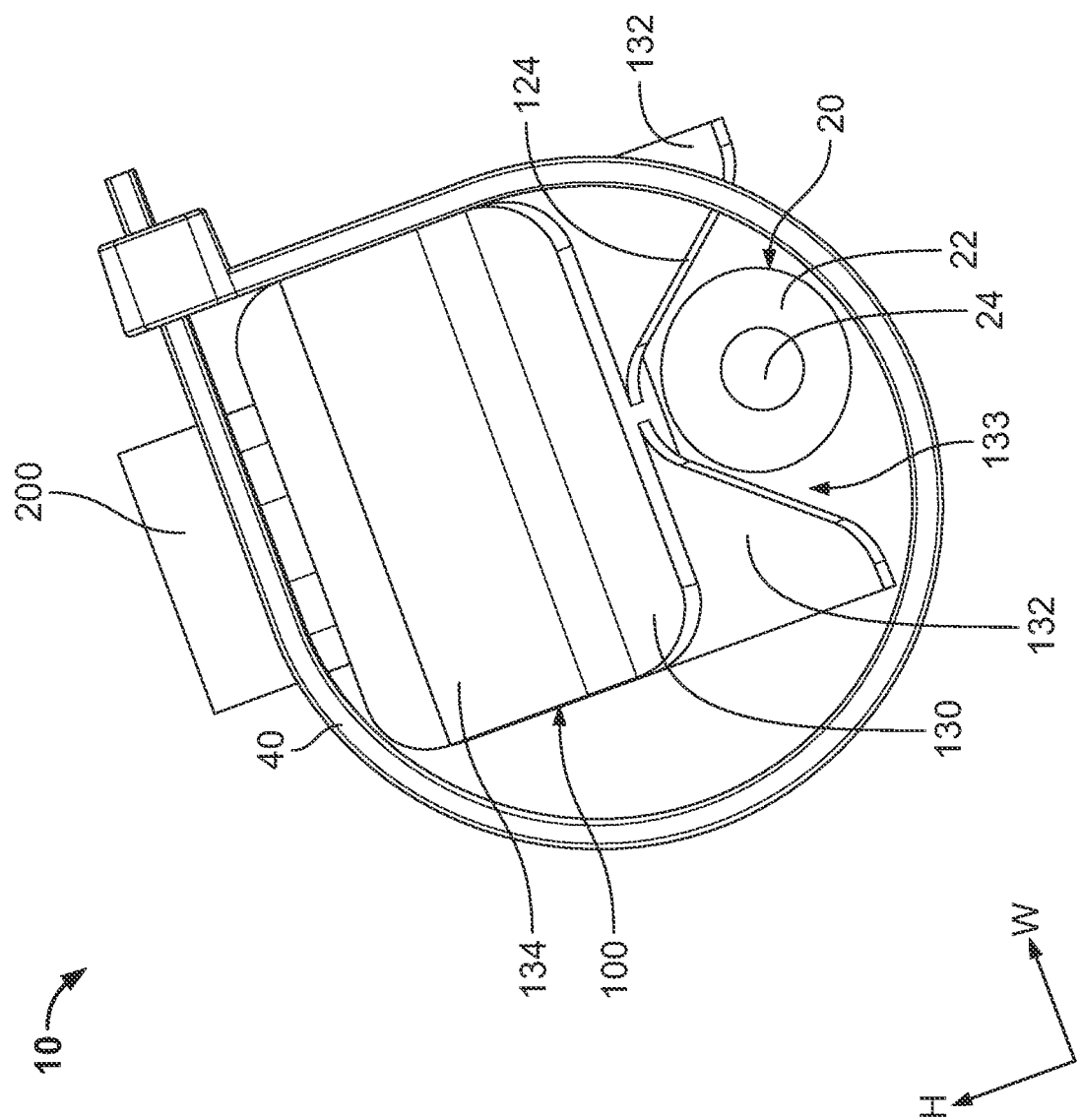
FIG. 4 is a side view of the power meter attached to a wire.

The power meter 10 in the assembled state shown in FIG. 1 is attached to the wire 20 having the conductor 24 as shown in FIG. 4. The wire 20 has an insulation 22 disposed around the conductor 24. The wire 20 is positioned against the outer surface 124 of the housing 100 between the protrusions 132 of the housing 100, in the protrusion opening 133 formed by the protrusions 132.

The power meter 10 is secured to the wire 20 by a plurality of fasteners 40, shown in FIGS. 1 and 4. The fasteners 40 are separate from the housing 100 and extend around the housing 100 and the wire 20 having the conductor 24 to attach the power meter 10 to the conductor 24. In the shown embodiment, the fasteners 40 are each a zip tie for fast and secure installation of the power meter 10 on the wire 20.

The conductor signal 30 is transmitted along the conductor 24 of the wire 20, as schematically shown in FIG. 3. The conductor signal 30 is used to provide power to the powered device 60. In various embodiments, the powered device 60 may be a constant volume fan or pump, a VFD fan or pump, or an ECM. These exemplary applications are not limiting, however, and the power meter 10 can be used as described herein with wires 20 attached to any other type of powered device 60 that receives power from the conductor signal 30 transmitted along the wire 20.

Figure 5:
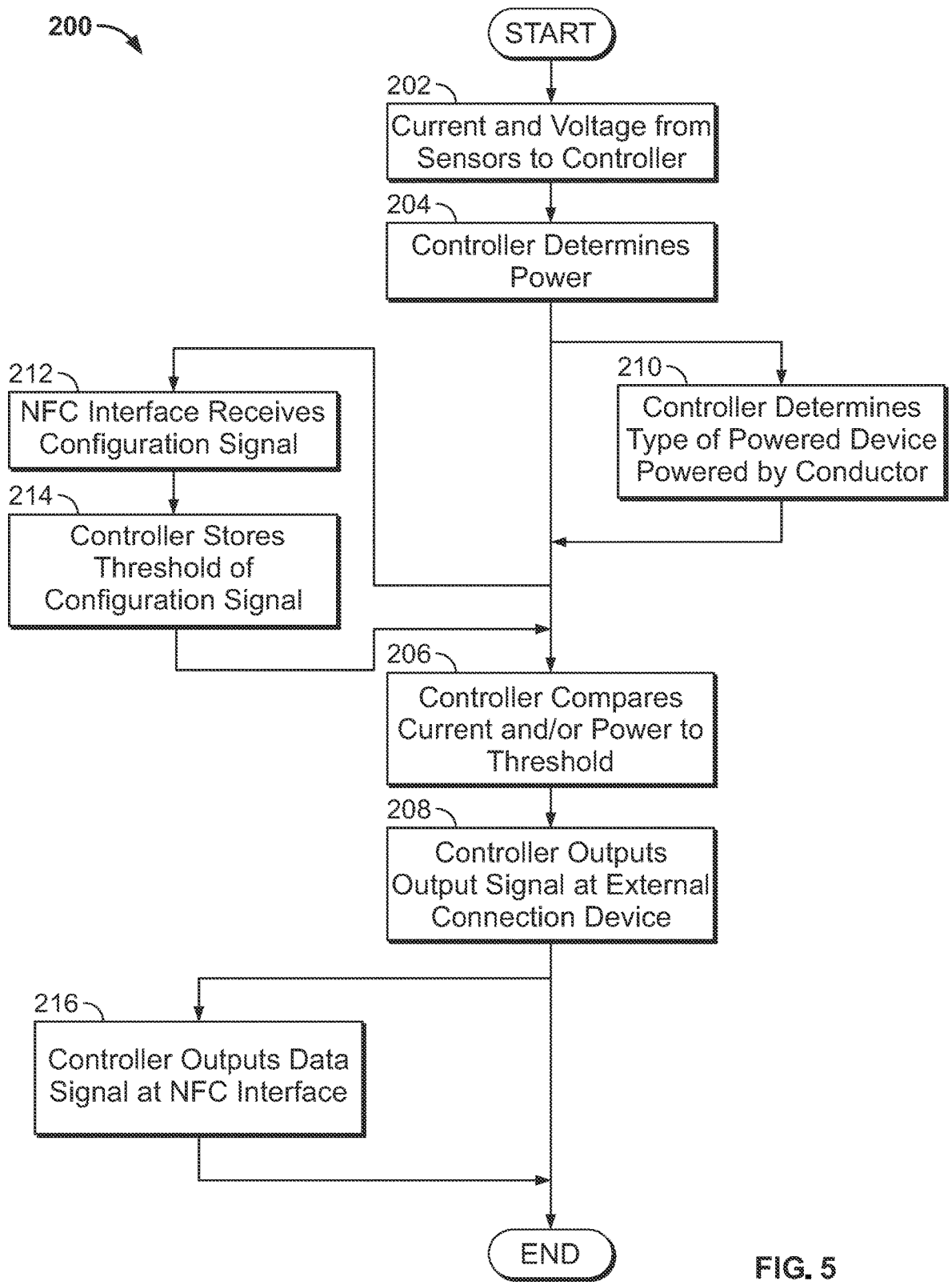
FIG. 5 is a flowchart of a process of using the power meter to determine qualities of a conductor signal and output a state of a powered device from the conductor signal.

A process 200 of using the power meter 10 to determine qualities of the conductor signal 30, and to output a state of the powered device 60 from the determined conductor signal 30, is shown in FIG. 5.

In a first step 202 shown in FIG. 5, the hall-effect current sensor 150 contactlessly senses a current of the conductor signal 30 transmitted along the conductor 24; the current of the conductor signal 30 creates a magnetic field that is detected by the hall-effect current sensor 150, which outputs a signal to the controller 190 indicative of the current of the conductor signal 30. In the first step 202, the voltage sensor 160 also contactlessly senses a voltage of the conductor signal 30; a capacitive coupling between the conductor signal 30 and the voltage sensor 160 affects the output of the voltage sensor 160 to the controller 190, which indicates the voltage of the conductor signal 30. The shielding 220 electromagnetically shields the hall-effect current sensor 150 and the voltage sensor 160.

In a second step 204 shown in FIG. 5, based on the current of the conductor signal 30 received from the hall-effect current sensor 150 and the voltage of the conductor signal 30 received from the voltage sensor 160, the controller 190 determines a power of the conductor signal 30. The processor 192 executes an algorithm stored in the memory 194 to calculate the power from the current and the voltage of the conductor signal 30 according to a relationship between power, current, and voltage that is well known in electrical engineering. The controller 190 can also determine a phase of the conductor signal 30 based on the current and the voltage received over time from the sensors 150, 160.

In a next step 206 shown in FIG. 5, the controller 190 compares the power of the conductor signal 30 to a threshold 198 stored in the memory 194; the threshold 198 is set such that, if the power transmitted along the conductor signal 30 is below the threshold 198, the powered device 60 is determined to be in an "off" state", and if the power is above a threshold 198, the powered device 60 is determined to be in a "run" state. In another embodiment, the power can be compared to an additional threshold 198 to determine whether the powered device 60 is in a "fault" state. In another embodiment, the thresholds 198 can each be a current level of the conductor signal 30 instead of the power, and the controller 190 can compare the current of the conductor signal 30 to the applicable thresholds 198 to determine a status or state of the powered device 60.

The threshold 198 is particular to the powered device 60 to which the wire 20 is connected. In an embodiment, the thresholds 198 can be preset in the memory 194 for use of the power meter 10 with a particular type of powered device 60.

In another embodiment, as shown in step 210 of FIG. 5, the controller 190 can determine the applicable thresholds 198 for the powered device 60 from a plurality of different thresholds 198 stored in the memory 194 by determining a type of powered device 60 to which the conductor 24 feeds the conductor signal 30. The controller 190 determines the type of powered device 60 by comparing at least one of the current, voltage, power, and phase of the conductor signal 30 to the electrical profiles 196 stored in the memory 194. The controller 190 determines the powered device 60 to be the device having the electrical profile 196 that most closely corresponds to the current, voltage, power, and phase of the conductor signal 30 determined in steps 202 and 204. The controller 190 can then retrieve the relevant thresholds 198 for use in step 206 as described above from the applicable electrical profile 196.

In another embodiment, as shown in steps 212 and 214 of FIG. 5, the NFC interface 180 can be connected to a computing device 50 as shown in FIG. 3. The computing device 50, such as a mobile device or laptop of a user, can transmit a configuration signal 182 to the NFC interface 180. The configuration signal 182 indicates the relevant thresholds 198 for the comparison in step 206 described above. The NFC interface 180 receives the configuration signal 182 from the computing device 50 in the step 212 and, after transmitting the configuration signal 182 to the controller 190, the controller 190 stores the relevant thresholds 198 in the memory 194 that were sent in the configuration signal 182.

In a step 208 shown in FIG. 5, after the controller 190 compares the power or current of the conductor signal 30 to the thresholds 198 determined according to at least one of the processes described above, the controller 190 outputs an output signal 202 at the external connection device 200 that represents the state or status of the powered device 60 determined by the comparison in step 206. The output signal 202 indicates whether the powered device 60 is in an "off" state, a "run" state, or a "fault" state.

The output signal 202 can be an analog signal or a digital signal according to any of the protocols of the external connection device 200 described above. In an embodiment in which the output signal 202 is an analog signal and the power meter 10 has the loop circuit 210, the controller 190 varies the output signal 202 from 4-20 mA via the loop circuit 210 to represent the status of the powered device 60. For example, an output signal 202 of 4 mA can indicate the "off" state, an output signal 202 of 12 mA can indicate a "run" state, and an output signal of 20 mA can indicate a "fault" state.

In an optional additional step 216 shown in FIG. 5, upon receiving a prompt from the computing device 50 via the NFC interface 180, the controller 190 can output a data signal 186 to the computing device 50 via the NFC interface 180; the data signal 186 indicates at least one of the power of the conductor signal 30, the current of the conductor signal 30, the voltage of the conductor signal 30, and a waveform of the conductor signal 30 determined by the controller 190. The controller 190 can also output to the computing device 50 via the NFC interface 180 the status of the powered device 60 based on the comparison in step 206.

The power meter 10 according to the invention determines the power of the conductor signal 30 transmitted along the conductor 24 without requiring contact with the conductor 24. The use of the hall-effect current sensor 150 avoids the need for an iron core in a current transformer, and the use of the voltage sensor 160 avoids the need to tap into the conductor 24, both of which decrease the necessary size of the power meter 10 and simplify the installation on the wire 20. The power meter 10 reliably outputs a state of the powered device 60 to which the wire 20 feeds power through the output signal 202, which is configurable or customizable via the NFC interface 180 to allow for greater flexibility applications of the power meter 10.

Figure 6:
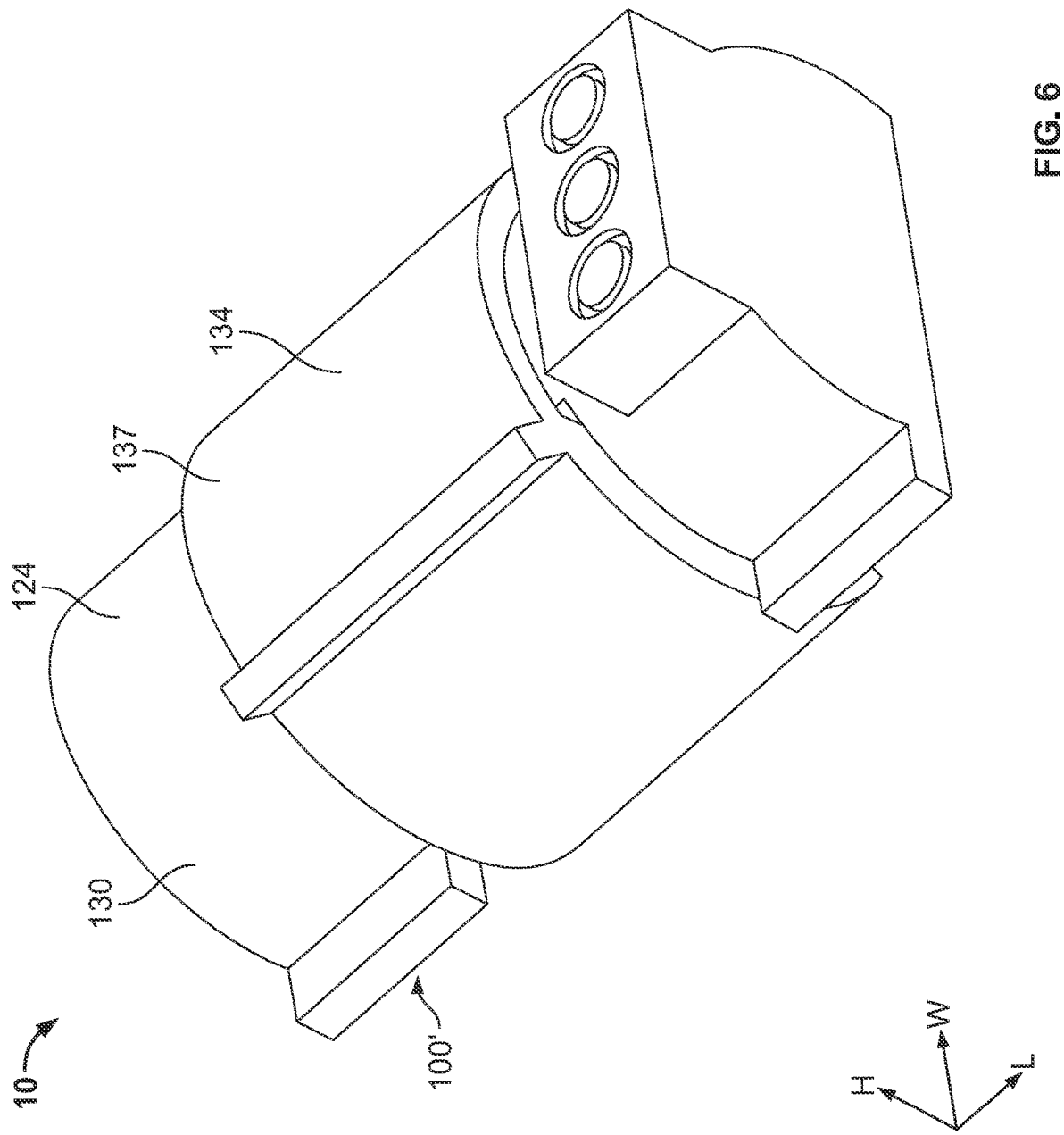
FIG. 6 is a perspective view of a power meter according to another embodiment having a different housing.
Figure 7:
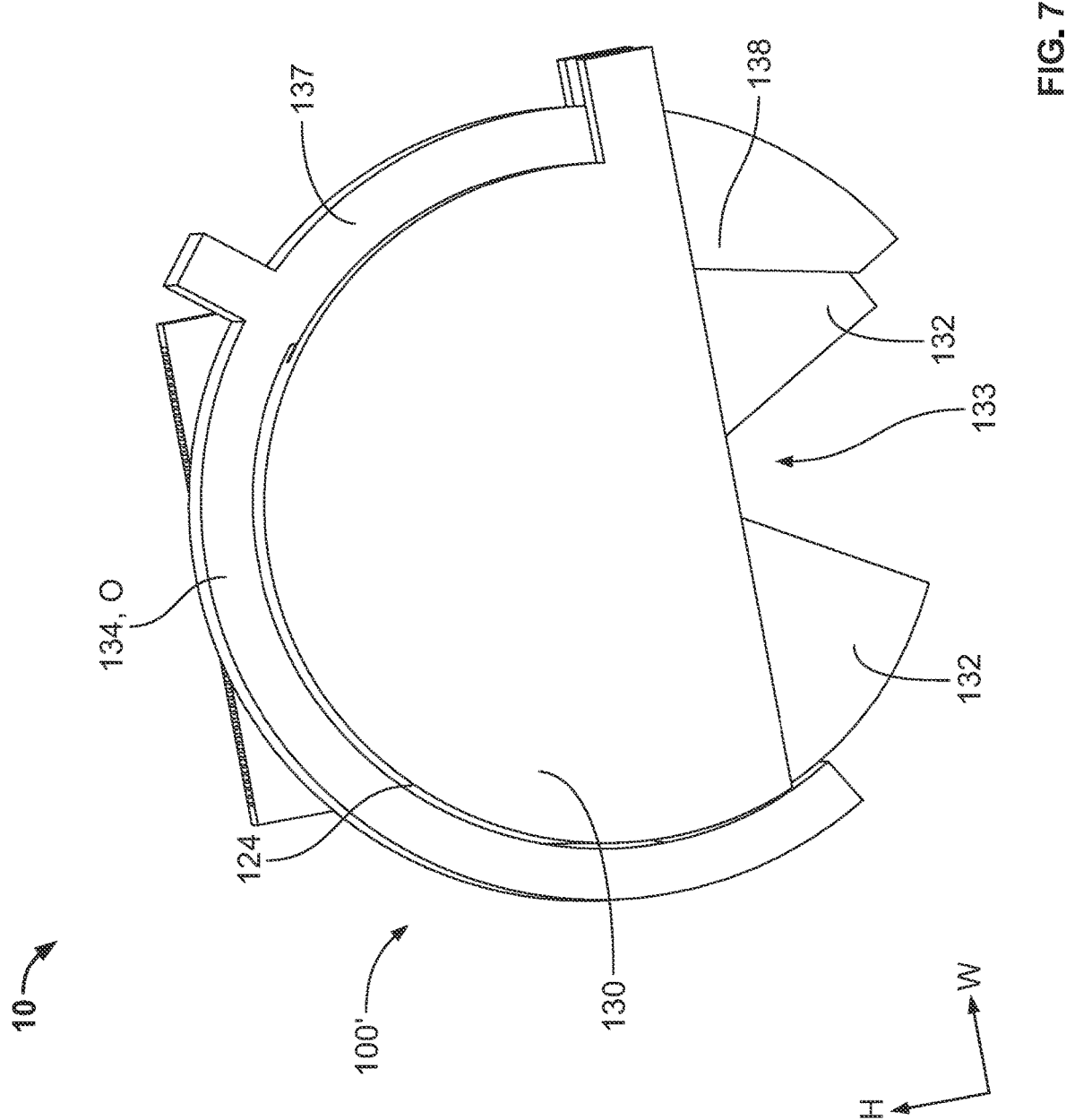
FIG. 7 is a side view of the power meter of FIG. 6 with the housing in an open position.

A power meter 10 according to another embodiment is shown in FIGS. 6-8. The power meter 10 shown in FIGS. 6-8 has a different housing 100' than the housing 100 shown in the embodiment of FIGS. 1-5; all other components of the power meter 10 shown in FIGS. 6-8, including the positioning and function of all the components other than the housing 100', the same as described above with respect to the embodiment of FIGS. 1-5 and will not be repeated below. Like reference numbers in FIGS. 6-8 refer to like elements of the embodiment of the power meter 10 shown in FIGS. 1-5. The housing 100' of the embodiment of FIGS. 6-8 will now be described in greater detail.

In the housing 100', the first portion 130 has an approximately cylindrical outer surface 124, as shown in FIGS. 6 and 7. The first portion 130 in the embodiment of FIGS. 6-8 encloses an interior area of the housing 100' in which the PCB 140 and the elements on the PCB 140 are disposed. The protrusions 132, as shown in FIG. 7, extend from a part of the circular profile of the first portion 130 and have the protrusion opening 133 defined between them.

In the housing 100', the second portion 134 has a curved body 137 that is a semicircular-shaped element attachable to the outer surface 124 of the first portion 130 and is rotatable with respect to the first portion 130 between an open position O, shown in FIG. 7, and a closed position C, shown in FIG. 8. As shown in FIG. 8, at an end of the curved body 137, the second portion 134 has a pair of side sections 138 extending from the curved body 137.

The wire 20 having the conductor 24 is positionable adjacent to the first portion 130 of the housing 100' in the open position O of the second portion 134 shown in FIG. 7. The second portion 134 is then rotated to the closed position C shown in FIG. 8, in which the conductor 24 of the wire 20 is held between the first portion 130 and the second portion 134. In the closed position C, the protrusions 132 are positioned between the curved body 137 and the side sections 138 and are covered by the second portion 134 of the housing 100'. The housing 100' according to the embodiment of FIG. 6-8 thus allows for a different simple and releasable attachment of the power meter 10 to the wire 20 having the conductor 24.

What is claimed is:

1. A power meter, comprising:
   a housing attached to a conductor;
   a hall-effect current sensor disposed in the housing and contactlessly sensing a current of a conductor signal transmitted along the conductor;
   a voltage sensor disposed in the housing and contactlessly sensing a voltage of the conductor signal;
   a shielding disposed in the housing and electromagnetically shielding the hall-effect current sensor and the voltage sensor; and
   a printed circuit board disposed in the housing, the hall-effect current sensor, the voltage sensor, and the shielding are disposed on the printed circuit board, the shielding has a pair of panels each extending at an angle from the printed circuit board, the hall-effect current sensor and the voltage sensor are disposed between the panels.

2. The power meter of claim 1, wherein the voltage sensor is a voltage electrode that senses the voltage of the conductor signal by capacitance.

3. The power meter of claim 1, further comprising a controller connected to the hall-effect current sensor and the voltage sensor, the controller determines a power of the conductor signal from the current provided by the hall-effect current sensor and the voltage provided by the voltage sensor.

4. The power meter of claim 3, further comprising a near field communication interface connected to the controller.

5. The power meter of claim 4, wherein the near field communication interface receives a configuration signal from a computing device setting a threshold of the power of the conductor signal or the current of the conductor signal, the controller outputs a status of a powered device to which the conductor feeds the conductor signal based on the threshold.

6. The power meter of claim 4, wherein the controller outputs a data signal to a computing device via the near field communication interface, the data signal indicates at least one of the power of the conductor signal, the current of the conductor signal, the voltage of the conductor signal, and a waveform of the conductor signal.

7. The power meter of claim 3, further comprising an external connection device connected to the controller, the controller outputs an output signal at the external connection device representing a status of a powered device to which the conductor feeds the conductor signal, the controller determines the status of the powered device based on at least one of the current of the conductor signal and the power of the conductor signal.

8. The power meter of claim 7, wherein the output signal is an analog signal or a digital signal.

9. The power meter of claim 8, further comprising a loop circuit connected to the controller, the controller varies the output signal from 4-20 mA via the loop circuit to represent the status of the powered device.

10. The power meter of claim 3, wherein the controller determines a type of powered device to which the conductor feeds the conductor signal based on at least one of the current of the conductor signal, the voltage of the conductor signal, a phase of the conductor signal, and the power of the conductor signal.

11. The power meter of claim 1, wherein the housing has a pair of protrusions each receiving and covering one of the pair of panels.

12. The power meter of claim 11, wherein a wire having the conductor is positioned against an outer surface of the housing between the pair of protrusions.

13. The power meter of claim 1, further comprising a plurality of fasteners separate from the housing, the fasteners extend around the housing and the conductor to attach the power meter to the conductor.

14. The power meter of claim 1, wherein the housing has a first portion and a second portion rotatable with respect to the first portion between an open position and a closed position.

15. The power meter of claim 14, wherein the conductor is positionable adjacent to the first portion of the housing in the open position and the conductor is held between the first portion and the second portion in the closed position.

16. The power meter of claim 15, wherein the first portion of the housing has a pair of protrusions, the second portion of the housing has a curved body and a pair of side sections extending from the curved body, the protrusions are positioned between the curved body and the side sections and are covered by the second portion of the housing in the closed position.

17. The power meter of claim 1, further comprising an additional sensor disposed in the housing and sensing at least one of a humidity and a temperature of an environment of the power meter.

18. A power meter, comprising:
   a housing attached to a conductor;
   a hall-effect current sensor disposed in the housing and contactlessly sensing a current of a conductor signal transmitted along the conductor;

a voltage sensor disposed in the housing and contactlessly sensing a voltage of the conductor signal; and a controller connected to the hall-effect current sensor and the voltage sensor, the controller determines a power of the conductor signal from the current provided by the hall-effect current sensor and the voltage provided by the voltage sensor, the controller determines a type of powered device to which the conductor feeds the conductor signal based on at least one of the current of the conductor signal, the voltage of the conductor signal, a phase of the conductor signal, and the power of the conductor signal.

19. A power meter, comprising:

a housing attached to a conductor, the housing has a first portion and a second portion rotatable with respect to the first portion between an open position and a closed position, the conductor is positionable adjacent to the first portion of the housing in the open position and the conductor is held between the first portion and the second portion in the closed position, the first portion of the housing has a pair of protrusions, the second portion of the housing has a curved body and a pair of side sections extending from the curved body, the protrusions are positioned between the curved body and the side sections and are covered by the second portion of the housing in the closed position;

a hall-effect current sensor disposed in the housing and contactlessly sensing a current of a conductor signal transmitted along the conductor; and a voltage sensor disposed in the housing and contactlessly sensing a voltage of the conductor signal.

20. A power meter, comprising:

a housing attached to a conductor;

a hall-effect current sensor disposed in the housing and contactlessly sensing a current of a conductor signal transmitted along the conductor;

a voltage sensor disposed in the housing and contactlessly sensing a voltage of the conductor signal;

a controller connected to the hall-effect current sensor and the voltage sensor, the controller determines a power of the conductor signal from the current provided by the hall-effect current sensor and the voltage provided by the voltage sensor; and a near field communication interface connected to the controller, the near field communication interface receives a configuration signal from a computing device setting a threshold of the power of the conductor signal or the current of the conductor signal, the controller outputs a status of a powered device to which the conductor feeds the conductor signal based on the threshold.

* * * * *